US009513398B2

United States Patent
Wilson et al.

(10) Patent No.: US 9,513,398 B2
(45) Date of Patent: Dec. 6, 2016

(54) CASING MOUNTED EM TRANSDUCERS HAVING A SOFT MAGNETIC LAYER

(71) Applicant: Halliburton Energy Services, Inc., Duncan, OK (US)

(72) Inventors: Glenn A. Wilson, Houston, TX (US); Burkay Donderici, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 220 days.

(21) Appl. No.: 14/082,534

(22) Filed: Nov. 18, 2013

(65) Prior Publication Data

US 2015/0137817 A1    May 21, 2015

(51) Int. Cl.
  *G01V 3/28*   (2006.01)
  *G01V 3/30*   (2006.01)
  (Continued)

(52) U.S. Cl.
  CPC .................. *G01V 3/12* (2013.01); *E21B 43/10* (2013.01); *E21B 43/12* (2013.01);
  (Continued)

(58) Field of Classification Search
  CPC ...................................................... G01V 3/12
  (Continued)

(56) References Cited

U.S. PATENT DOCUMENTS 4,090,141 A    5/1978  LeBlanc
4,222,261 A    9/1980  LeBlanc et al.
(Continued)

FOREIGN PATENT DOCUMENTS

GB    2433112 A    6/2007
GB    2433112 B    7/2008
(Continued)

OTHER PUBLICATIONS

"Automated identification of changes in electrode contact properties for long-term permanent ERT monitoring experiments", J. Deceuster, O. Kaufmann & V. Camp, 2013, Automated identification of changes in electrode contact properties for long-term permanent ERT monitoring experiments: Geophysics, vol. 78 (2), E79-E94, 16 pgs.
(Continued)

*Primary Examiner* — Bot Ledynh
(74) *Attorney, Agent, or Firm* — Iselin Law PLLC; Benjamin Fite (57) ABSTRACT

Illustrative permanent electromagnetic (EM) monitoring systems and methods have a casing string positioned inside a borehole and equipped with one or more EM transducer modules having a layer of soft magnetic material that substantially encircles the casing string to amplify a signal response of a magnetic field transmitting and/or sensing element. The layer preferably has an axial dimension at least twice an axial dimension of the magnetic field sensing element, with a relative permeability at least twice that of the casing material. The magnetic field transmitting element can be a coil. The magnetic field sensing element can be a coil or a piezoelectric or magnetostrictive element that applies stress to an optical fiber. A well interface system communicates with the one or more EM transducer modules to transmit and/or collect EM signals over time. Additional casing strings may be provided in other nearby boreholes to enable tomographic mapping and monitoring of fluid interfaces in the reservoir.

27 Claims, 3 Drawing Sheets

(51) Int. Cl.
*G01V 3/12* (2006.01)
*E21B 43/10* (2006.01)
*E21B 43/12* (2006.01)
*E21B 47/022* (2012.01)
*E21B 47/09* (2012.01)

(52) U.S. Cl.
CPC .... *E21B 47/02216* (2013.01); *E21B 47/0905* (2013.01); *G01V 3/28* (2013.01)

(58) Field of Classification Search
USPC ................................................. 324/333, 338
See application file for complete search history.

(56) References Cited

U.S. PATENT DOCUMENTS

| | | |
|---|---|---|
| 4,348,587 A | 9/1982 | Tangonan et al. |
| 4,376,248 A | 3/1983 | Giallorenzi et al. |
| 4,433,291 A | 2/1984 | Yariv et al. |
| 4,596,442 A | 6/1986 | Anderson et al. |
| 4,622,460 A | 11/1986 | Failes et al. |
| 4,868,495 A | 9/1989 | Einzig et al. |
| 4,918,371 A | 4/1990 | Bobb |
| 4,973,845 A | 11/1990 | Mastrippolito et al. |
| 5,275,038 A | 1/1994 | Sizer et al. |
| 5,294,788 A | 3/1994 | Charon et al. |
| 5,305,075 A | 4/1994 | Bucholtz et al. |
| 5,471,139 A | 11/1995 | Zadoff |
| 5,754,284 A | 5/1998 | Leblanc et al. |
| 5,804,736 A | 9/1998 | Klauder et al. |
| 6,229,308 B1* | 5/2001 | Freedman ................ 324/303 |
| 6,229,808 B1 | 5/2001 | Teich et al. |
| 6,289,740 B1 | 9/2001 | Posey et al. |
| 6,294,917 B1 | 9/2001 | Nichols |
| 6,314,056 B1 | 11/2001 | Bunn et al. |
| 6,463,186 B1 | 10/2002 | Li |
| 6,534,986 B2 | 3/2003 | Nichols |
| 6,724,469 B2 | 4/2004 | Leblanc |
| 6,747,743 B2 | 6/2004 | LeBlanc et al. |
| 6,809,516 B1 | 10/2004 | Li et al. |
| 6,957,576 B2 | 10/2005 | Skinner et al. |
| 7,077,200 B1 | 7/2006 | Adnan et al. |
| 7,151,377 B2 | 12/2006 | Chouzenoux et al. |
| 7,477,160 B2 | 1/2009 | Lemenager et al. |
| 7,489,134 B2 | 2/2009 | Reiderman |
| 7,747,388 B2 | 6/2010 | Mombourquette et al. |
| 8,035,393 B2 | 10/2011 | Tenghamn et al. |
| 8,379,438 B2 | 2/2013 | Tio Castro et al. |
| 9,091,785 B2 | 7/2015 | Donderici et al. |
| 2001/0023614 A1 | 9/2001 | Tubel et al. |
| 2003/0038634 A1 | 2/2003 | Strack |
| 2003/0057950 A1 | 3/2003 | Gao et al. |
| 2003/0205083 A1 | 11/2003 | Tubel et al. |
| 2003/0205375 A1 | 11/2003 | Wright et al. |
| 2004/0006429 A1 | 1/2004 | Brown |
| 2004/0104051 A1* | 6/2004 | Moriarty et al. ............... 175/57 |
| 2004/0117119 A1 | 6/2004 | West et al. |
| 2004/0140091 A1 | 7/2004 | Gupta |
| 2006/0081412 A1 | 4/2006 | Wright et al. |
| 2006/0214098 A1 | 9/2006 | Ramos |
| 2006/0220651 A1* | 10/2006 | Clark ............................ 324/368 |
| 2006/0272809 A1 | 12/2006 | Tubel et al. |
| 2007/0278008 A1* | 12/2007 | Kuckes et al. ................. 175/40 |
| 2008/0041575 A1* | 2/2008 | Clark et al. ................. 166/65.1 |
| 2008/0042636 A1 | 2/2008 | Koste et al. |
| 2008/0053702 A1 | 3/2008 | Smith |
| 2008/0210426 A1 | 9/2008 | Lembcke et al. |
| 2008/0241964 A1 | 10/2008 | Kaieda et al. |
| 2009/0044977 A1* | 2/2009 | Johnson et al. ................. 175/24 |
| 2009/0071080 A1 | 3/2009 | Bourgain et al. |
| 2009/0179647 A1* | 7/2009 | Wang et al. .................. 324/339 |
| 2009/0199630 A1 | 8/2009 | Difoggio et al. |
| 2009/0237084 A1 | 9/2009 | Itskovich et al. |
| 2009/0268197 A1 | 10/2009 | Perron et al. |
| 2009/0308657 A1* | 12/2009 | Clark et al. .................... 175/45 |
| 2010/0046002 A1 | 2/2010 | Perez et al. |
| 2010/0097065 A1* | 4/2010 | Itskovich et al. ............. 324/336 |
| 2010/0118657 A1* | 5/2010 | Trinh et al. ...................... 367/82 |
| 2010/0134113 A1 | 6/2010 | Depavia et al. |
| 2010/0224362 A1 | 9/2010 | Carazzone |
| 2010/0237084 A1 | 9/2010 | Freed |
| 2010/0271030 A1 | 10/2010 | Reiderman et al. |
| 2011/0074428 A1 | 3/2011 | Wang |
| 2011/0088462 A1 | 4/2011 | Samson et al. |
| 2011/0090496 A1 | 4/2011 | Samson et al. |
| 2011/0100632 A1 | 5/2011 | Dinariev et al. |
| 2011/0139447 A1 | 6/2011 | Ramos et al. |
| 2011/0170112 A1 | 7/2011 | Leblanc et al. |
| 2011/0198078 A1 | 8/2011 | Harrigan et al. |
| 2011/0277996 A1 | 11/2011 | Cullick et al. |
| 2011/0298461 A1 | 12/2011 | Bittar et al. |
| 2011/0308788 A1 | 12/2011 | Ravi et al. |
| 2012/0001625 A1 | 1/2012 | Yamada et al. |
| 2012/0013893 A1 | 1/2012 | Maida et al. |
| 2012/0014211 A1 | 1/2012 | Maida et al. |
| 2012/0061084 A1 | 3/2012 | Sweatman et al. |
| 2012/0126993 A1 | 5/2012 | Samson et al. |
| 2012/0147381 A1 | 6/2012 | Leblanc et al. |
| 2012/0205103 A1 | 8/2012 | Ravi et al. |
| 2012/0234605 A1 | 9/2012 | Donderici et al. |
| 2012/0257475 A1 | 10/2012 | Luscombe et al. |
| 2013/0018585 A1 | 1/2013 | Zhdanov et al. |
| 2013/0018588 A1 | 1/2013 | Zhdanov et al. |
| 2013/0032404 A1 | 2/2013 | Donderici et al. |
| 2013/0056197 A1 | 3/2013 | Maida et al. |
| 2013/0105224 A1 | 5/2013 | Donderici et al. |
| 2013/0141102 A1 | 6/2013 | Donderici et al. |
| 2013/0166215 A1 | 6/2013 | Bittar et al. |
| 2013/0169278 A1 | 7/2013 | Bittar et al. |
| 2013/0248250 A1 | 9/2013 | Bittar et al. |
| 2013/0249705 A1 | 9/2013 | Sharp et al. |
| 2013/0279841 A1 | 10/2013 | Joinson |
| 2014/0097848 A1 | 4/2014 | Leblanc et al. |
| 2014/0139225 A1 | 5/2014 | Mandviwala |
| 2014/0139226 A1 | 5/2014 | Jaaskelainen et al. |
| 2014/0191120 A1 | 7/2014 | Donderici et al. |

FOREIGN PATENT DOCUMENTS

| | | |
|---|---|---|
| GB | 2452609 A | 3/2009 |
| JP | 2011069700 | 7/2011 |
| WO | WO-99/06668 | 2/1999 |
| WO | WO-2012005737 | 1/2012 |
| WO | WO-2012144977 | 10/2012 |
| WO | WO-2013/066436 | 5/2013 |
| WO | WO-2014/109816 | 7/2014 |
| WO | WO-2015/073138 | 5/2015 |
| WO | WO-2015/178876 | 11/2015 |
| WO | WO-2015/178878 | 11/2015 |

OTHER PUBLICATIONS

"Crosswell electromagnetic tomography: System design considerations and field results", M. J. Wilt, D. L. Alumbaugh, H. F. Morrison, A. Becker, K. H. Lee & M. Deszez-Pan, 1995, Crosswell electromagnetic tomography: System design considerations and field results: Geophysics, 60 (3), 871-885, 15 pgs.
"HES Invention Disclosure", dated Jul. 18, 2013, "Method and Apparatus for Monitoring an Injection Front in an Oil or Gas Reservoir From an Existing Well Using Tilted Antennas", 24 pgs.
"Reservoir monitoring in oil sands: Developing a permanent crosswell system", R. Tøndel, J. Ingham, D. LaBrecque, H. Schütt, D. McCormick, R. Godfrey, J. A. Rivero, S. Dingwall & A. Williams, 2011, Reservoir monitoring in oil sands: Developing a permanent cross-well system: Presented at SEG Annual Meeting, San Antonio, 5 pgs.
"Surface-downhole electrical resistivity tomography applied to monitoring of CO2 storage at Ketzin, Germany", P. Bergmann, C. Schmidt-Hattenberger, D. Kiessling, C. Rucker, T. Labitzke, J. Henninges, G. Baumann & H. Schutt, 2012, Surface-downhole electrical resistivity tomography applied to monitoring of CO2 storage at Ketzin, Germany: Geophysics, vol. 77 (6), 15 pgs.

(56) References Cited

OTHER PUBLICATIONS

Donderici, Burkay et al., "Compensated Cross-Well Tomography Methods and Systems", PCT Appl No. PCT/US2011/055020 filed Oct. 6, 2011,19 pgs.
Donderici, Burkay et al., "Fiberoptic Systems and Methods for Formation Monitoring", U.S. Appl. No. 13/736,324, filed Jan. 8, 2013, 21 pgs.
Donderici, Burkay, et al., "Full Tensor Micro-Impedence Imaging", PCT Appl No. PCT/US2012/044931, filed Jun. 29, 2012, 29 pgs.
Donderici, Burkay et al., "Logging While Drilling (LWD) Steering Visualization Tool Methods and Systems", PCT Appl No. PCT/US2013/045650 filed Jun. 13, 2013,44 pgs.
Donderici, Burkay, et al., "Multi-Axial Induction Borehole Imager", PCT Appl No. PCT/US2012/044945, filed Jun. 29, 2012, 29 pgs.
Donderici, Burkay et al., "Workflow Adjustment Methods and Systems for Logging Operations", PCT Appl No. PCT/US2013/061757 filed Sep. 25, 2013, 38 pgs.
Guner, Baris et al., "Multicomponent Borehole Radar Systems and Methods", PCT Appl No. PCT/US2011/032865 filed Apr. 18, 2011, 41 pgs.
Hou, Junsheng et al., "Multi-Component Induction Logging Methods and Systems Having a Trend-Based Data Quality Indicator", PCT Appl No. PCT/US2013/063682 filed Oct. 27, 2013, 26 pgs.
LeBlanc, Michel J., et al., "Fiberoptic Systems an Methods Detecting EM Signals Via Resistive Heating", U.S. Appl No. 13/648,897, filed Oct. 10, 2012, 18 pgs.
San Martin, Luis E., et al., "Fiberoptic Systems and Methods for Subsurface EM Field Monitoring", U.S. Appl No. 13/736,487, filed Jan. 8, 2013, 19 pgs.
Wu, Hsu-Hsiang et al., "Deep Formation Evaluation Systems and Methods", PCT Appl No. PCT/US2012/071550 filed Dec. 23, 2012, 23 pgs.
Wu, Hsu-Hsiang et al., "Resistivity Logging Systems and Methods Employing Ratio Signal Set for Inversion", PCT Appl No. PCT/US2012/043937 filed Jun. 25, 2012, 27 pgs.
Wu, Hsu-Hsiang et al., "Tilted Antenna Logging Systems and Methods Yielding Robust Measurement System", PCT Appl No. PCT/US2012/043943 filed Jun. 25, 2012, 30 pgs.
"PCT Application as Filed", Appl No. PCT/US2014/038542, "A Magnetic Induction Sensor with an Electro-Optical Transducer and Related Methods and Systems," Filed May 19, 2014, 30 pgs.
"PCT Application as Filed", PCT/US2014/038552, "Optical Magnetic Field Sensor Units for a Downhole Environment," Filed May 19, 2014, 24 pgs.
"PCT Written Opinion", Dated Jan. 10, 2014, Appl No. PCT/US2013/064115, filed Oct. 9, 2013, 10 pgs.
"PCT Written Opinion", Dated Feb. 17, 2014, Appl No. PCT/US2013/067285, "Fiberoptic Systems and Methods for Formation Monitoring," Filed Nov. 29, 2013, 14 pgs.
"UK Examination Report", dated Feb. 5, 2014, Appl No. 1315987.6, "Fiberoptic Systems and Methods Detecting EM Signals Via Resistive Heating", filed Sep. 9, 2013, 6 pgs.
"US Non-Final Office Action", Dated Oct. 31, 2014, U.S. Appl. No. 13/736,324, "Fiberoptic Systems and Methods for Formation Monitoring," Filed Jan. 8, 2013, 12 pgs.
"US Non-Final Office Action", dated Aug. 14, 2014, U.S. Appl. No. 13/648,897, "Fiberoptic Systems and Methods Detecting EM Signals Via Resistive Heating ," filed Oct. 10, 2012, 22 pgs.
"International Search Report and Written Opinion" dated Jan. 10, 2014, Appl No. PCT/US2013/064122, filed Oct. 9, 2013, 10 pgs.
Campanella, Humberto et al., "Comparative performance of static-mode ferrous MEMS gradiometers fabricated by a three-step DRIE process", Journal of Micromechanics and Microengineering, vol. 20 No. 4, May 21, 2010, 10 pgs.

Donderici, Burkay "Compensated Cross-Well Tomography Methods and Systems", PCT Appl No. PCT/US2011/055020, filed Oct. 6, 2011, 19 pgs.
Donderici, Burkay et al., "Pulsed-Electric Drilling Systems and Methods with Formation Evaluation and/or Position Tracking", U.S. Appl No. 13/564,230, filed Aug. 1, 2012, 23 pgs.
Hsu-Hsiang, Wu et al., "Resistivity Logging Systems and Methods Employing Ratio Signal Set for Inversion", PCT Appl No. PCT/US2012/043937, filed Jun. 25, 2012, 27 pgs.
Hsu-Hsiang, Wu et al., "Tilted Antenna Loggings Systems and Methods Yielding Robust Measurement Signals", PCT Appl No. PCT/US2012/043943, filed Jun. 25, 2012, 30 pgs.
Jaaskelainen, Mikko et al., "Optical Push-Pull Interferometric Sensors for Electromagnetic Sensing", U.S. Appl. No. 13/679,940, filed Nov. 16, 2012, 34 pgs.
LeBlanc, Michel "Cementing Plug Tracking Using Distributed Strain Sensing", U.S. Appl No. 13/562,456, filed Jul. 31, 2012, 19 pgs.
Maida, John L., et al., "Downhole Species Selective Optical Fiber Sensor Systems and Methods", U.S. Appl No. 13/253,788, filed Oct. 5, 2011, 23 pgs.
Maida, John L., et al., "Optical Casing Collar Locator Systems and Methods", U.S. Appl. No. 13/226,578, filed Sep. 7, 2011, 30 pgs.
Mandviwala, Tasneem A., "Well Monitoring with Optical Electromagnetic Sensors", U.S. Appl No. 13/679,926, filed Nov. 16, 2012, 28 pgs.
Nie, Xiaochun et al., "Multi-Array Laterolog Tools and Methods with Split Monitor Electrodes", PCT Appl No. PCT/US2012/046757, filed Jul. 15, 2012, 29 pgs.
Ravi, Kris et al., "Downhole Fluid Tracking with Distributed Acoustic Sensing", "Downhole Fluid Tracking with Distributed Acoustic Sensing", U.S. Appl. No. 13/726,054, filed Dec. 22, 2012, 24 pgs.
Samson, Etienne M., et al., "Downhole Systems and Methods for Water Source Determination", U.S. Appl No. 13/418,455, filed Mar. 13, 2012, 27 pgs.
Sharp, David P., et al., "Casing Collar Locator with Wireless Telemetry Support", U.S. Appl No. 13/426,414, filed Mar. 21, 2012, 30 pgs.
Skinner, Neal G., et al., "Downhole Time Domain Reflectometry with Optical Components", U.S. Appl. No. 13/655,607, filed Oct. 19, 2012, 32 pgs.
Tumanski, Slawomir "Induction coil sensors-a review", Institute of Physics Publishing, Measurement Science and Technology. 18 (2007) R31-R46, (2007), 17 pgs.
Vohra, S. T. et al., "Fiber-optic ac electric-field sensor based on the electrostrictive effect", Optic Letters, vol. 17, No. 5, Mar. 1, 1992, 3 pgs.
"PCT International Search Report and Written Opinion", dated Feb. 4, 2015, Appl No. PCT/US2014/038542, "A Magnetic Induction Sensor with an Electro-Optical Transducer and Related Methods and Systems," filed May 19, 2014, 17 pgs.
"PCT International Search Report and Written Opinion", dated Jan. 22, 2015, Appl No. PCT/US2014/059633, "Casing Mounted EM Transducers Having a Soft Magnetic Layer", filed Oct. 8, 2014, 16 pgs.
"PCT International Search Report and Written Opinion", dated Feb. 17, 2015, Appl No. PCT/US2014/038552, "Optical Magnetic Field Sensor Units for a Downhole Environment," filed May 19, 2015, 15 pgs.
"International Preliminary Report on Patentability", dated Aug. 14, 2015, "A Magnetic Induction Sensor With an Electro-Optical Transducer and Related Methods and Systems", Appl. No. PCT/US2014/038542 filed May 19, 2014, 16 pgs.
"PCT International Report on Patentability", dated Aug. 25, 2015, Appl No. PCT/US2014/059633, "Casing Mounted EM Transducers Having a Soft Magnetic Layer", filed Oct. 8, 2014, 19 pgs.

\* cited by examiner

Fig. 1

CASING MOUNTED EM TRANSDUCERS HAVING A SOFT MAGNETIC LAYER

BACKGROUND

Oilfield operators are faced with the challenge of maximizing hydrocarbon recovery within a given budget and timeframe. While they perform as much logging and surveying as feasible before and during the drilling and completion of production and, in some cases, injection wells, the information gathering process does not end there. It is desirable for the operators to track the movement of fluids in and around the reservoirs, as this information enables them to adjust the distribution and rates of production among the producing and/or injection wells to avoid premature water breakthroughs and other obstacles to efficient and profitable operation. Moreover, such information gather further enables the operators to better evaluate treatment and secondary recovery strategies for enhanced hydrocarbon recoveries.

The fluid saturating the formation pore space is often measured in terms of a hydrocarbon fraction and a water fraction. Due to the solubility and mobility of ions in water, the water fraction lends itself to indirect measurement via a determination of formation resistivity. The ability to remotely determine and monitor formation resistivity is of direct relevance to long term reservoir monitoring, particularly for enhanced oil recovery (EOR) operations with water flooding and/or $CO_2$ injection. Hence, a number of systems have been proposed for performing such remote formation resistivity monitoring.

One such proposed system employs "electrical resistivity tomography". Such systems employ galvanic electrodes which suffer from variable and generally degrading contact resistance with the formation due to electrochemical degradation of the electrode. This variability directly affects data quality and survey repeatability. See, e.g., J. Deceuster, O. Kaufmann, and V. Van Camp, 2013, "Automated identification of changes in electrode contact properties for long-term permanent ERT monitoring experiments" Geophysics, vol. 78 (2), E79-E94. There are difficulties associated with ERT on steel casing. See, e.g., P. Bergmann, C. Schmidt-Hattenberger, D. Kiessling, C. Rucker, T. Labitzke, J. Henninges, G. Baumann, and H. Schutt, 2012, "Surface-downhole electrical resistivity tomography applied to monitoring of CO2 storage at Ketzin, Germany" Geophysics, vol. 77 (6), B253-B267. See also R. Tondel, J. Ingham, D. LaBrecque, H. Schutt, D. McCormick, R. Godfrey, J. A. Rivero, S. Dingwall, and A. Williams, 2011, "Reservoir monitoring in oil sands: Developing a permanent cross-well system" Presented at SEG Annual Meeting, San Antonio. Thus, it has been preferred for ERT systems to be deployed on insulated (e.g., fiberglass) casing. However, insulated casing is generally impractical for routine oilfield applications.

Crosswell electromagnetic (EM) tomography systems have been proposed as a non-permanent solution to reservoir monitoring. See, e.g., M. J. Wilt, D. L. Alumbaugh, H. F. Morrison, A. Becker, K. H. Lee, and M. Deszcz-Pan, 1995, "Crosswell electromagnetic tomography: System design considerations and field results" Geophysics, 60 (3), 871-885. The proposed crosswell EM tomography systems involve the wireline deployment of inductive transmitters and receivers in separate wells. However, the wells in a typical oilfield are cased with carbon steel casing, which is both highly conductive and magnetically permeable. Hence, the magnetic fields external of the casing are greatly reduced. Moreover, the casing is typically inhomogeneous, having variations in casing diameter, thickness, permeability, and conductivity, resulting from manufacturing imperfections or from variations in temperature, stress, or corrosion after emplacement. Without precise knowledge of the casing properties, it is difficult to distinguish the casing-induced magnetic field effects from formation variations. See discussion in E. Nichols, 2003, "Permanently emplaced electromagnetic system and method of measuring formation resistivity adjacent to and between wells" U.S. Pat. No. 6,534,986.

There do exist a number of apparently-speculative publications relating to permanent EM reservoir monitoring systems. See, e.g., Nichols 2003; K. M. Strack, 2003, "Integrated borehole system for reservoir detection and monitoring" US Pat. App. 2003/0038634; and A. Reiderman, L. G. Schoonover, S. M. Dutta, and M. B. Rabinovich, 2010, "Borehole transient EM system for reservoir monitoring" US Pat. App. US2010/0271030. However, it does not appear that any such systems have yet been developed for deployment, and may in fact be unsuitable for their proposed uses. For example, Nichols 2003 proposes the incorporation of long slots in the steel casing to disrupt the flow of induced counter currents in the casing, but slotted casing may be expected to have significantly weaker structural integrity and does not appear to be a viable solution. It appears that the other proposed systems fail to adequately account for the presence of casing effects, and in fact the present authors believe such effects would render the performance of these other proposed systems inadequate.

BRIEF DESCRIPTION OF THE DRAWINGS

Accordingly, there are disclosed in the drawings and the following description various permanent electromagnetic (EM) monitoring devices, systems, and methods, employing casing mounted EM transducers with high permeability layers. In the drawings.

It should be understood, however, that the specific embodiments given in the drawings and detailed description do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Certain disclosed device, system, and method embodiments provide permanent electromagnetic (EM) monitoring of the regions around and between wells. Each borehole is provided with a casing string having one or more EM transducer modules with a layer of soft magnetic material that substantially encircles the casing string to amplify a signal response of a magnetic field transmission and/or sensing element. The magnetic field field transmitting element can be a coil. The magnetic field sensing element can be a coil or a piezoelectric or magnetostrictive element that applies stress to an optical fiber. For coils, the layer preferably has an axial dimension at least twice an axial dimension of the coil, with a relative permeability at least twice that of the casing material. A well interface system communicates with the one or more EM transducer modules to transmit and/or collect EM signal measurements over time. Additional casing strings may be provided in other nearby boreholes to enable tomographic mapping and monitoring of fluid saturations in the reservoir.

Figure 1:
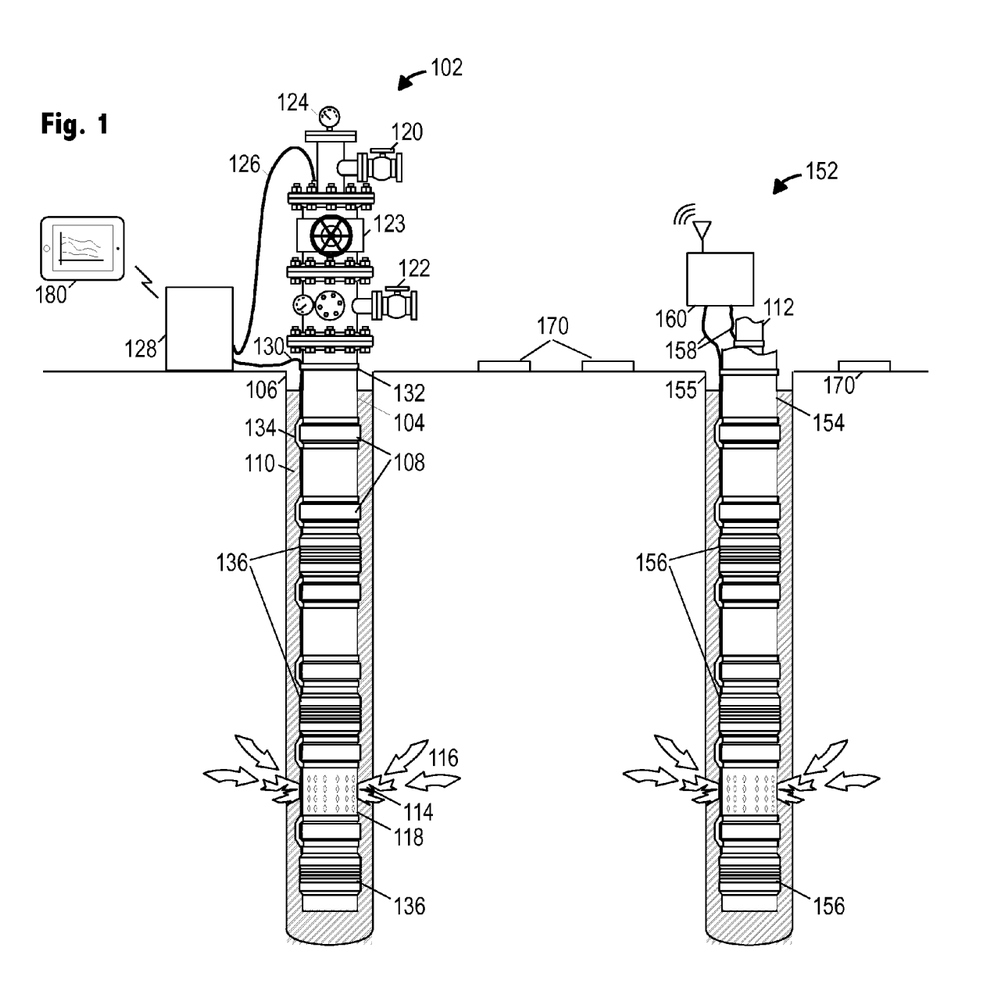
FIG. 1 is a schematic depiction of an illustrative permanent EM monitoring system.

FIG. 1 shows a well 102 equipped with an illustrative embodiment of a permanent electromagnetic (EM) monitoring system. The illustrated well 102 has been constructed and completed in a typical manner, and it includes a casing string 104 positioned in a borehole 106 that has been formed in the earth by a drill bit. The casing string 104 includes multiple casing tubulars (usually 30 foot long carbon steel tubulars) connected end-to-end by couplings 108. Alternative casing types include continuous tubing and, in some rare cases, composite (e.g., fiberglass) tubing. Cement 110 has been injected between an outer surface of the casing string 104 and an inner surface of the borehole 106 and allowed to set. The cement enhances the structural integrity of the well and seals the annulus around the casing against undesired fluid flows. Though well 102 is shown as entirely cemented, in practice certain intervals may be left without cement, e.g., in horizontal runs of the borehole where it may be desired to facilitate fluid flows.

Perforations 114 have been formed at one or more positions along 106 to facilitate the flow of a fluid 116 from a surrounding formation into the borehole and thence to the surface. The casing string may include pre-formed openings 118 in the vicinity of the perforations 114, or it may be perforated at the same time as the formation. Typically the well 102 is equipped with a production tubing string positioned in an inner bore of the casing string 104. (A counterpart production tubing string 112 is visible in the cutaway view of well 152.) One or more openings in the production tubing string accept the borehole fluids and convey them to the earth's surface and onward to storage and/or processing facilities via production outlet 120. The well head may include other ports such as port 122 for accessing the annular space(s) and a blowout preventer 123 for blocking flows under emergency conditions. Various other ports and feed-throughs are generally included to enable the use of external sensors 124 and internal sensors. Illustrative cable 126 couples such sensors to a well interface system 128. Note that this well configuration is merely for illustrative purposes, is not to scale, and is not limiting on the scope of the disclosure.

The interface system 128 typically supplies power to the transducers and provides data acquisition and storage, possibly with some amount of data processing. The permanent EM monitoring system is coupled to the interface system 128 via an armored cable 130, which is attached to the exterior of casing string 104 by straps 132 and protectors 134. (Protectors 134 guide the cable 130 over the couplings 108 and shield the cable from being pinched between the coupling and the borehole wall.) The cable 130 connects to one or more electromagnetic transducer modules 136 attached to the casing string 104. As described further below, each of the transducer modules 136 includes a layer of nonconductive material having a high permeability to reduce interference from casing effects.

FIG. 1 further shows a second well 152 having a second casing string 154 in a borehole 155, with one or more EM transducer modules 156 attached to the casing string and communicating via one or more cables 158 to a second well interface system 160. The second well interface system may be connected in a wired or wireless fashion to the first well interface system or to a central system that coordinates the operation of the wells. Additional wells and well interfaces may be included in the coordinated operation of the field and the permanent EM monitoring system. (Some system embodiments employ EM transducer modules in only one well, but it is generally preferred to provide additional EM transducer modules on the surface and/or in other nearby wells.)

The illustrated system further includes surface transducer modules 170. The surface transducer modules 170 may employ spaced-apart electrodes that create or detect EM signals, wire coils that create or detect EM signals, or magnetometers or other EM sensors to detect EM signals. At least one of the transducer modules 136, 156, 170 transmits EM signals while the rest obtain responsive measurements. In some implementations, each of the transducer modules is a single-purpose module, i.e., suitable only for transmitting or receiving, but it is contemplated that in at least some implementations, the system includes one or more transducer modules that can perform both transmitting and receiving.

The EM transducer modules transmit or receive arbitrary waveforms, including transient (e.g., pulse) waveforms, periodic waveforms, and harmonic waveforms. The transducer modules can further measure natural EM fields including magnetotelluric and spontaneous potential fields. Suitable EM signal frequencies for reservoir monitoring include the range from 1 Hz to 10 kHz. In this frequency range, the modules may be expected to detect signals at transducer spacings of up to about 200 feet, though of course this varies with transmitted signal strength and formation conductivity.

FIG. 1 further shows a tablet computer 180 that communicates wirelessly with the well interface system 128 to obtain and process EM measurement data and to provide a representative display of the information to a user. The computer 180 can take different forms including a laptop, desktop computer, and virtual cloud computer. Whichever computer embodiment is employed includes software that configures the computer's processor(s) to carry out the necessary processing and to enable the user to view and preferably interact with a display of the resulting information. The processing includes at least compiling a time series of measurements to enable monitoring of the time evolution, but may further include the use of a geometrical model of the reservoir that takes into account the relative positions and configurations of the transducer modules and inverts the measurements to obtain one or more parameters. Those parameters may include a resistivity distribution and an estimated water saturation.

The computer 180 may further enable the user to adjust the configuration of the transducers, employing such parameters as firing rate of the transmitters, firing sequence of the transmitters, transmit amplitudes, transmit waveforms, transmit frequencies, receive filters, and demodulation techniques. In some contemplated system embodiments, the computer further enables the user to adjust injection and/or production rates to optimize production from the reservoir.

At least one of the references discussed in the background contemplates the winding of wire coils around the casing to serve as a magnetic dipole antenna. However carbon steel, the typical casing material, has a high conductivity (greater than $10^6$ S/m). This conductivity enables the casing to support the flow of induced countercurrents which interfere with the transmitted or received signal. Moreover, steel itself is typically a "hard" magnetic material, meaning that it has a lossy hysteresis curve that further dissipates EM energy. These characteristics make the casing itself a poor choice as the core of a magnetic transducer, offsetting any gains realized by the casing's relative permeability. (The relative magnetic permeability of carbon steel is approximately 100.) The effective magnetic permeability of a carbon steel casing core can be less than one, yielding a degradation of the desired signals.

Accordingly, the illustrative EM transducer module configurations shown in FIGS. 2A-2D employ a layer of material that is non-conductive (a bulk conductivity of no more than 1 S/m and preferably less than $10^{-2}$ S/m) and having a high relative magnetic permeability (at least 200 and preferably greater than 500). The layer of material acts as a preferred channel for the magnetic field lines, reducing the magnetic field in the casing and thereby lessening the signal degradation caused by the casing. In the illustrative configuration of FIG. 2A, which is provided primarily for descriptive purposes, a magnetically permeable sleeve 202 surrounds the casing 104 in the region of coil 204. Straps 206 hold the coil 204 in place on top of the sleeve 202. A controllable switch 205 is provided to switch the coil into and out of the electrical path, thereby controlling whether coil 204 is energized by a current along cable 130 (or whether an incident EM field can induce a current along cable 130). Connectors 208 are provided to facilitate the connection of cable 130 to the illustrative transducer module, enabling the module to be assembled and calibrated ahead of time and incorporated into the casing string without undue disruption of the casing string assembly and running process.

Figure 2A:
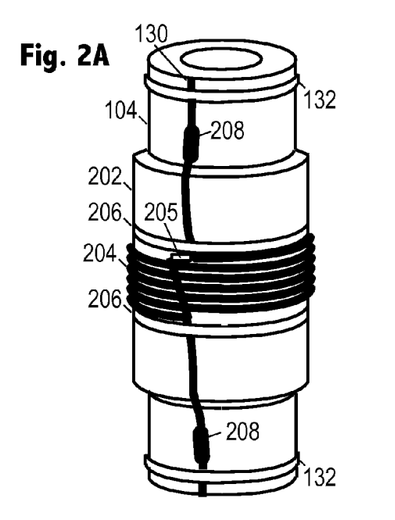
FIGS. 2A-2D show illustrative EM transducers for permanent EM monitoring.

The thicker the sleeve 202 and the higher the relative permeability of the sleeve, the more effective the sleeve will be at reducing the effects of the casing 104. The sleeve material is preferably a soft magnetic material such as a ferrite. The magnetic material may be suspended in a nonconductive matrix material suitable for downhole use. Such matrix materials include vulcanized rubber, polymers (e.g., polytetrafluoroethylene or poly-ether-ether-ketone), epoxy, and ceramics. The sleeve thickness is limited by the mechanics of the well. Well completion engineers generally limit the radial dimension of the annulus around the casing to no more than about one inch. As space must be permitted for the flow of cement slurry, the thickness of the sleeve (and any windings or protection thereon) may need to be limited to about one-half inch. Thicknesses of as little as 1 mm are expected to enhance performance, though thicknesses of at least 5 mm are preferred. The thickness need not be uniform, though performance may be dominated by the thickness of the thinnest regions proximate to the coil.

The axial dimension of the sleeve is also a factor in improving the transducer module's performance. Generally speaking, the larger the ratio of the sleeve's axial dimension to the coil's axial dimension, the greater the suppression of induced counter currents. However, diminishing returns are observed at higher ratios, so in practice the ratio of axial dimensions may be kept in a range between 2 and 10. Ratios of at least 3 are preferred, with minimum values of 4 and 6 being particularly contemplated.

Figure 2B:
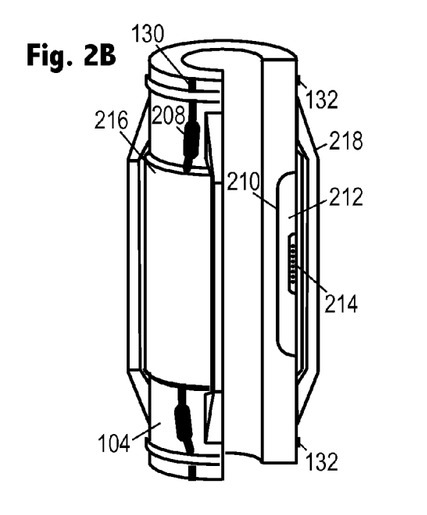

As mentioned above, the configuration of FIG. 2A is primarily for illustrative purposes. In practice, the cable 130 and coil 204 should be protected from being crushed between the casing and the borehole wall. FIG. 2B shows a partially-sectioned view of a more protective configuration in which a recess 210 has been machined into the wall of the casing 104 and filled with the ferritic material 212. The wire coil 214 overlays the ferritic material and is protected beneath a thin shell 216 of nonconductive, nonmagnetic material such as fiberglass or one of the matrix materials mentioned above. A plurality of non-magnetic centralizing arms 218 further protects the transducer module. Electronics may be included in the module to derive power from the cable and control the transmission or reception process. The electronics may further process and store measurement data and transmit the measurement data to the interface system via the cable 130 or some other telemetry mechanism.

Figure 2C:
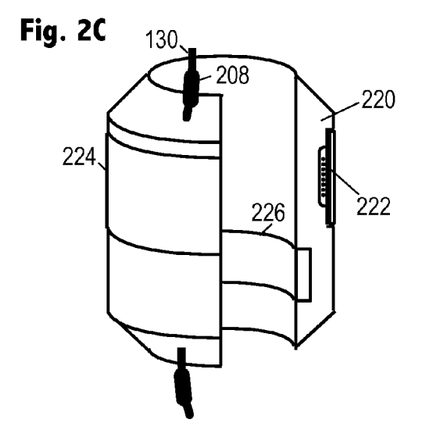

The embodiment of FIG. 2B necessitates significant modification of a casing tubular. FIG. 2C is a partially-sectioned view of an alternative EM transducer module embodiment that can be slipped over the pin end of a casing tubular just before the tubular is connected to extend the casing string. The module can be secured in place with an adhesive or a clamp. The module's body 220 is primarily formed from the ferritic material, with a circumferential groove cut for the coil 222 and a protective shell 224. The body 220 further includes a recess 226 for electronics. Connectors 208 may be provided to facilitate connection of the cable 130. In an alternative implementation, body 220 may be realized as a bladder that can be inflated with a ferromagnetic fluid or a suspension of magnetic nanoparticles. Such inflation can be performed before, during, or after deployment in the borehole.

Figure 2D:
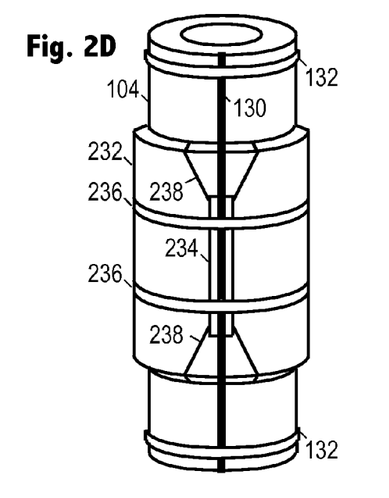

The transducer module embodiments of FIGS. 2A-2C each include a coil as the primary transducer element. FIG. 2D employs an optical sensing approach. The cable 103 includes an optical fiber that interacts with a magnetic field sensing element 234. A layer 232 of nonconductive, high-permeability material amplifies the magnetic field across the element 234, intensifying the field's effect on the optical fiber. Nonmagnetic inserts 238 may be provided to modify the shape of the field and thereby improve the transducer's performance. Element 234 may be a magnetostrictive material that modulates the strain in the optical fiber in relation to the sensed field. Straps 236 secure the module to the casing 104. Alternatively, element 234 may be a piezoelectric transducer or an atomic magnetometer.

For each of the disclosed embodiments, the method and materials of fabrication are chosen for the specific application. In some cases, the modules may be designed specifically for high pressure (e.g., 35,000 psi) and high temperature (e.g., >260° C.) environments, with continuous vibrations expected for extended periods of time, such as are typically encountered in oilfield wells. The modules may be designed to enable mass production while facilitating field deployment as system as part of a permanent EM monitoring system.

We note here that each of the transducer modules are shown as a wired embodiment, i.e., with the cable 130 physically connecting to the transducer modules. Such modules should be made compliant with industry standards such as the intelligent well interface standard (IWIS). (Compliance with such low power standards is further facilitated by the improved performance and reduced dissipation enabled by the use of the high permeability layers.) However, it is not a requirement for the transducer modules to be wired to the interface system. Rather, one or more of the modules may be self-contained. Wireless communication may be supported via acoustic or EM transmission. Power may be obtained from batteries or super-capacitors and, for long term monitoring, the power may be replenished by fuel cells, energy harvesting, and/or wireless power transmission from a wireline tool. In both the wired and self-contained embodiments, the EM transducer modules benefit from being non-contact sensors and hence unaffected contact resistance variations.

Figure 3:
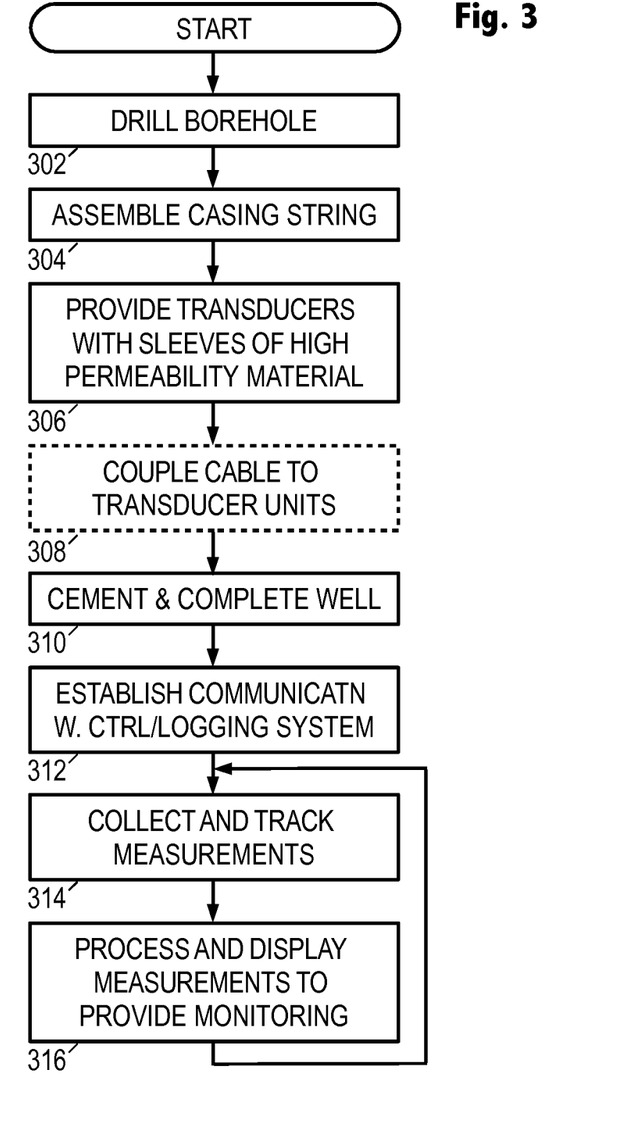
FIG. 3 is a flow chart of an illustrative permanent EM monitoring method.

FIG. 3 is a flow diagram of an illustrative permanent EM monitoring method. The method begins in block 302 with a crew drilling a borehole. In block 304, the crew assembles a casing string and lowers it into place in the borehole. During this assembly and running process, the crew equips the casing string with one or more EM transducer modules having layers of nonconductive, high permeability material in block 306. In block 308, the crew optionally connects the transducer module(s) to an armored cable and straps the cable to the casing as it is run into the borehole. The cable may provide power and/or wiring or optical fibers for interrogation and/or telemetry. In block 310, the crew cements the well, creating a permanent installation of the casing string and any attached EM transducer modules. The crew may further complete the well, performing any needed perforation, treatment, equipping, and conditioning operations to optimize production. The well may alternatively be an injection well or a "dry well" created solely for monitoring.

In block 312, communication is established between the well interface system and the EM transducer modules (e.g., by connecting the cable conductors to the appropriate terminals). In block 314, the interface system periodically induces the transmit modules to fire in a time, frequency, or code-multiplexed manner and collects measurements from the receive modules. The measurements may be indicative of signal amplitude, attenuation, phase, delay, spectrum, or other suitable variables from which the desired formation information can be derived. Measurement of natural or environmental EM signals may also be performed at this stage. In block 316, the interface system or an attached computer processes the measurements and provides a representative display to a user to enable long term monitoring of the reservoir status. Blocks 314 and 316 are repeated to build up a time history of the measurements.

Numerous variations and modifications will become apparent to those skilled in the art once the above disclosure is fully appreciated. For example, the figures show system configurations suitable for reservoir monitoring, but they are also readily usable for treatment operations, cementing operations, active and passive electromagnetic surveys, and production monitoring. As another example, the illustrated transducers have coaxial coil configurations, but tilted coils could alternatively be employed to provide azimuthal and/or multi-component sensitivity. It is intended that the following claims be interpreted to embrace all such variations and modifications.

What is claimed is:

1. A permanent electromagnetic (EM) monitoring system that comprises:
    a casing string installed inside a borehole, the casing string having at least one EM transducer module that includes:
        a wire coil that encircles the casing string; and
        a layer of soft magnetic material between the coil and the casing string; and
    a well interface system coupled to the at least one EM transducer module to periodically transmit and/or collect EM signals in order to monitor at least one parameter of the subsurface formation over time.

2. The system of claim 1, wherein the casing string includes multiple EM transducer modules.

3. The system of claim 2, further comprising:
    a second casing string positioned inside a second borehole and having at least one EM transducer module; and
    a second well interface system coupled to the at least one EM transducer module in the second borehole to collect and/or transmit EM signals over time.

4. The system of claim 3, further comprising a computer that receives measurements from each of said well interface systems, wherein the computer images and/or inverts said measurements to monitor at least one parameter of the subsurface formation over time.

5. The system of claim 4, wherein said at least one parameter includes fluid saturation.

6. The system of claim 1, wherein said layer has an axial dimension at least twice an axial dimension of the wire coil.

7. The system of claim 1, wherein said layer has a thickness between 1 mm and 15 mm.

8. The system of claim 1, wherein said layer has a relative permeability of at least 200 and a conductivity of less than 1 S/m.

9. The system of claim 1, wherein the at least one EM transducer module is a self-contained unit that communicates wirelessly with the well interface system.

10. The system of claim 1, wherein the at least one EM transducer module further includes a connector for a wired connection to the well interface system.

11. The system of claim 1, wherein said layer is created in a recess on an exterior surface of a casing tubular.

12. The system of claim 1, further comprising a module body encased about a casing tubular, wherein said layer is integral to said module body.

13. A permanent electromagnetic (EM) monitoring method that comprises:
    installing a casing string in a borehole, the casing string including at least one EM transducer module with a layer of soft magnetic material underlying a wire coil that encircles the casing string;
    establishing communication between a well interface system and the at least one EM transducer module; and
    employing the at least one EM transducer module to periodically transmit and/or collect EM signals in order to monitor at least one parameter of the subsurface formation over time.

14. The method of claim 13, further comprising cementing the casing string in place.

15. The method of claim 13, further comprising imaging and/or inverting said EM signals to monitor at least one parameter of the subsurface formation over time.

16. The method of claim 15, wherein said parameter is fluid saturation.

17. A permanent electromagnetic (EM) monitoring system that comprises:
    a casing string installed inside a borehole, the casing string having at least one EM transducer module that includes:
        a magnetic field sensing element; and
        a layer of soft magnetic material that substantially encircles the casing string to amplify a signal response of the magnetic field sensing element; and
    a well interface system coupled to the at least one EM transducer module to periodically collect EM signals in order to monitor at least one parameter of the subsurface formation over time.

18. The system of claim 17, further comprising an optical fiber that couples the magnetic field sensing element to the well interface system.

19. The system of claim 18, wherein the magnetic field sensing element is a piezoelectric or magnetostrictive material that modulates a strain in said optical fiber to represent a received EM signal.

20. A permanent electromagnetic (EM) monitoring method that comprises:
    installing a casing string in a borehole, the casing string including at least one EM transducer module with a magnetic field sending element and a layer of soft magnetic material that substantially encircles the casing string to amplify a signal response of the magnetic field sensing element;

establishing communication between a well interface system and the at least one EM transducer module; and employing the at least one EM transducer module to periodically collect EM signals in order to monitor at least one parameter of the subsurface formation over time.

21. . The method of claim 20, further comprising cementing the casing string in place.

22. The method of claim 20, further comprising imaging and/or inverting said EM signals to monitor at least one parameter of the subsurface formation over time.

23. The method of claim 22, wherein said parameter is fluid saturation.

24. The system of claim 1, wherein the layer is integrated with an attachable sleeve.

25. The method of claim 13, wherein the layer is integrated with an attachable sleeve.

26. The system of claim 17, wherein the layer is integrated with an attachable sleeve.

27. The method of claim 20, wherein the layer is integrated with an attachable sleeve.

* * * * *